(12) United States Patent
Schuller

(10) Patent No.: US 11,188,084 B2
(45) Date of Patent: Nov. 30, 2021

(54) METHOD FOR OPERATING A MOTOR VEHICLE IN A NAVIGATION SURROUNDING AREA, AND MOTOR VEHICLE

(71) Applicant: AUDI AG, Ingolstadt (DE)

(72) Inventor: Florian Schuller, Ismaning (DE)

(73) Assignee: Audi AG, Ingolstadt (DE)

( * ) Notice: Subject to any disclaimer, the term of this patent is extended or adjusted under 35 U.S.C. 154(b) by 144 days.

(21) Appl. No.: 16/341,367

(22) PCT Filed: Sep. 18, 2017

(86) PCT No.: PCT/EP2017/073457
§ 371 (c)(1),
(2) Date: Apr. 11, 2019

(87) PCT Pub. No.: WO2018/068992
PCT Pub. Date: Apr. 19, 2018

(65) Prior Publication Data
US 2020/0019179 A1 Jan. 16, 2020

(30) Foreign Application Priority Data

Oct. 13, 2016 (DE) .......................... 102016219987.0

(51) Int. Cl.
*G05D 1/02* (2020.01)
*B60W 30/09* (2012.01)
(Continued)

(52) U.S. Cl.
CPC ........... *G05D 1/0221* (2013.01); *B60W 30/09* (2013.01); *B60W 30/12* (2013.01); *G05D 1/0055* (2013.01); *G05D 1/0236* (2013.01)

(58) Field of Classification Search
CPC .. G05D 1/0221; G05D 1/0055; G05D 1/0236; G05D 2201/0213; G05D 1/0274;
(Continued)

(56) References Cited

U.S. PATENT DOCUMENTS 9,784,585 B2 10/2017 Fausten
9,995,585 B2 6/2018 Altinger et al.
(Continued)

FOREIGN PATENT DOCUMENTS

CN 103528592 A 1/2014
DE 19534942 C1 5/1998
(Continued)

OTHER PUBLICATIONS

Chen et al., DeepDriving: Learning Affordance for Direct Perception in Autonomous Driving, Proceedings of 15th IEEE International Conference on Computer Vision (ICCV2015), Sep. 26, 2015, https://deepdriving.cs.princeton.edu/paper.pdf (Year: 2015).*
(Continued)

*Primary Examiner* — Yuen Wong
(74) *Attorney, Agent, or Firm* — Sterne, Kessler, Goldstein & Fox P.L.L.C.

(57) ABSTRACT

The disclosure relates to a method for operating a motor vehicle in a navigation surrounding area, e.g., a parking area. A digital navigation map, which describes a of the navigation surrounding area is used to describe a roadway network. A navigation route to a destination contained in the navigation map is determined by a navigation system of the motor vehicle according to the navigation map. Sensor data from a sensor device on the motor vehicle is used to describe environment of the motor vehicle. The navigation system carries out a vehicle guidance algorithm based on the sensor data and is trained by a machine learning process using training data. The motor vehicle is guided along the navi-
(Continued)

gation route automatically according to a lateral and/or longitudinal guidance action ascertained by the vehicle guidance algorithm.

16 Claims, 2 Drawing Sheets

(51) Int. Cl.
*B60W 30/12* (2020.01)
*G05D 1/00* (2006.01)

(58) Field of Classification Search
CPC ... B60W 30/09; B60W 30/12; B62D 15/0285; G08G 1/166; G08G 1/168; G01C 21/3407
See application file for complete search history.

(56) References Cited

U.S. PATENT DOCUMENTS

| | | |
|---|---|---|
| 2008/0027607 A1 | 1/2008 | Ertl et al. |
| 2013/0231824 A1 | 9/2013 | Wilson et al. |
| 2015/0344028 A1 | 12/2015 | Gieseke et al. |
| 2016/0047660 A1* | 2/2016 | Fausten ............... B62D 15/025 701/25 |
| 2016/0103449 A1* | 4/2016 | Desnoyer ............ G05D 1/0061 701/23 |
| 2017/0284810 A1* | 10/2017 | Altinger ................ G01C 21/32 |
| 2017/0308092 A1 | 10/2017 | Altinger et al. |
| 2017/0369074 A1 | 12/2017 | Mathes et al. |

FOREIGN PATENT DOCUMENTS

| | | |
|---|---|---|
| DE | 19938691 A1 | 2/2001 |
| DE | 102004019337 A1 | 11/2005 |
| DE | 102005047591 A1 | 4/2007 |
| DE | 102009047264 A1 | 6/2011 |
| DE | 102011112990 A1 | 3/2013 |
| DE | 102013205840 A1 | 10/2014 |
| DE | 102014013208 B3 | 1/2016 |
| DE | 102014015075 A1 | 4/2016 |
| DE | 102014018913 A1 | 6/2016 |
| DE | 102015001631 A1 | 8/2016 |
| DE | 102016003261 A1 | 9/2016 |

OTHER PUBLICATIONS

International Preliminary Report on Patentability directed to related International Patent Application No. PCT/EP2017/073457, dated Apr. 16, 2019, with attached English language translation; 13 pages.
International Search Report and Written Opinion of the International Searching Authority directed to related International Patent Application No. PCT/EP2017/073457, dated Dec. 15, 2017, with attached English-language translation; 20 pages.
Chen, Chenyi et al., "DeepDriving: Learning Affordance for Direct Perception in Autonomous Driving," The 15th IEEE International Conference on Computer Vision, (ICCV), 2015, 9 pages.
Chinese Application No. 201780067872.2, Office Action dated Jul. 5, 2021; English Translation from EPO Global Dossier, 7 pages.

* cited by examiner

METHOD FOR OPERATING A MOTOR VEHICLE IN A NAVIGATION SURROUNDING AREA, AND MOTOR VEHICLE

TECHNICAL FIELD

The disclosure relates to a method for operating a motor vehicle in a navigation environment, in particular a parking environment, a digital navigation map of the navigation environment that describes a roadway network being used, and a navigation route to a target position contained in the navigation map being determined by a navigation system of the motor vehicle, taking account of the navigation map, sensor data describing the surroundings of the motor vehicle being detected by a sensor device on the motor vehicle side. The disclosure further relates to a motor vehicle.

BACKGROUND

Motor vehicles are often operated in locally restricted navigation environments, a typical example of which is a parking environment, in particular parking blocks or carparks including a plurality of parking places. In order to improve the total traffic within the navigation environment, and to allow for better orientation for drivers within the navigation environment, it is known to transmit navigation maps for the corresponding navigation environment to the motor vehicle, for example by means of a central processing unit associated with the navigation environment. Since driving within navigation environments of this kind is sometimes challenging, and in particular precise maneuvering procedures are required, methods have been proposed in which the motor vehicle is driven in an automated manner at least intermittently, assisted by sensor data of a sensor device.

DE 10 2015 001 631 A1 discloses a method for operating a motor vehicle in a navigation environment, a central processing unit associated with the navigation environment receiving a navigation map of the navigation environment and determining a target position contained in the navigation map. Furthermore, a navigation system determines an ideal trajectory from the current position of the motor vehicle to the target position, taking account of the navigation map, and traces a current position of the motor vehicle in the navigation environment, the motor vehicle being guided to the ideal trajectory and then driven on the ideal trajectory upon an actuation control action by the driver.

A disadvantage thereof is that the sensor device required for the analytical assessment of the environment of the motor vehicle is very complex. In particular in the case of vehicles in what is known as the volume segment, however, only a restricted sensor visual range and/or quality is economically achievable, and this does not allow for complete assessment of a detected scenario in order to implement a guided driving function. In particular, the detection ranges, the resolution and the performance of typical sensor device are not sufficient to achieve a complete analytical description of all conceivable situations in the parking environment.

Applying technologies of machine learning in the field of automotive engineering has furthermore already been proposed.

DE 10 2014 018 913 A1 discloses a method for operating a driver assistance system of a motor vehicle, an environment of the motor vehicle being detected, using a sensor device of the motor vehicle belonging to the driver assistance system and at least one action of a driver of the motor vehicle, which action is associated with a driving movement of the motor vehicle, by a further sensor device of the motor vehicle belonging to the driver assistance system. Furthermore, the driver assistance system learns a correlation between the detected environment and the detected action by means of repeated detection of the environment and of the action, and a reliability of the learnt correlation is evaluated by the driver assistance system using a quality measure, whereupon at least one automated function, which is associated with a driving movement of the motor vehicle, is carried out by the driver assistance system in a manner dependent on the present environment of the motor vehicle and/or a value of the quality measure.

DE 10 2011 112 990 A1 discloses a system for controlling vehicles in order to carry out fully or partially automatic journeys, data being extracted from an experience file, i.e. routes being driven that have been driven once already, and in this case the data relating to all necessary steering, braking and speed actuations being extracted from said experience file.

DE 10 2005 047 591 A1 discloses a method for relieving the driver, when operating a motor vehicle, by means of a plurality of driver assistance systems for carrying out a plurality of different driving maneuvers as well as means for obtaining situation data for describing the current driving situation, situation data being obtained by the motor vehicle and the motor vehicle determining a limited number of driving maneuvers appropriate to the situation on the basis of the situation data, whereupon an agreement is reached between the motor vehicle and the driver regarding the implementation of an individual driving maneuver appropriate to the situation.

BRIEF DESCRIPTION OF THE DRAWINGS/FIGURES

DETAILED DESCRIPTION

Figure 1:
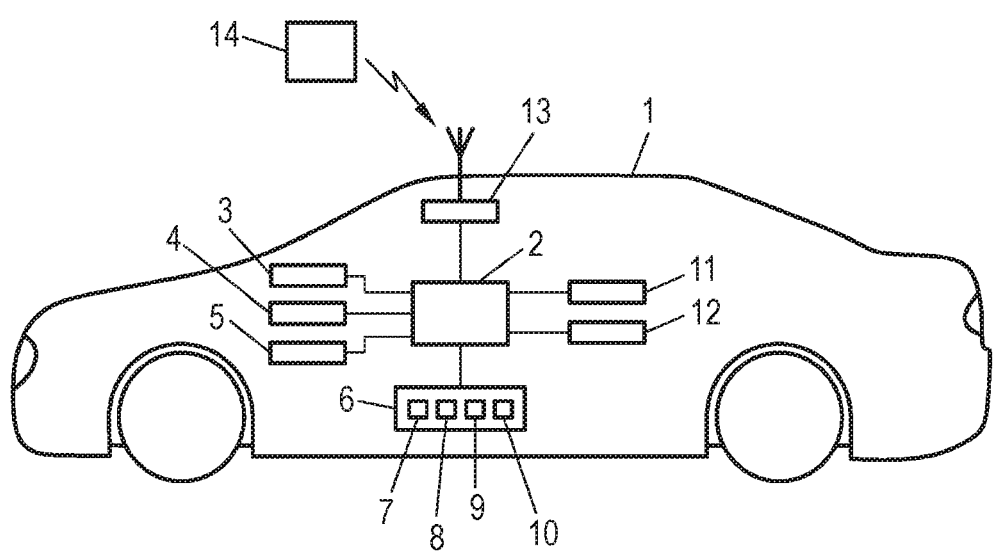
FIG. 1 is a schematic view of a motor vehicle according to some embodiments of the disclosure.

The object of the disclosure is therefore that of specifying an option for operating a motor vehicle in a navigation environment, in particular a parking environment, which option is improved compared therewith.

This object is achieved according to the disclosure by a method, in which a navigation system implements a vehicle guidance algorithm that uses the sensor data as input data and has been trained on the basis of training data, by means of machine learning, and the motor vehicle is guided automatically along a navigation route, at least intermittently according to at least one transverse and/or longitudinal guidance action determined by the vehicle guidance algorithm on the basis of the input data.

The disclosure is based on the concept of using machine learning in order to achieve the automated vehicle movement in the transverse and/or longitudinal direction, where the vehicle guidance algorithm trained on the basis of historical sensor data, in particular of the sensor device or of a sensor device of another motor vehicle, can be used. It is thus advantageously possible to omit the complex design of the sensor device for complete analytical situation interpretation, and to implement an automated driving function in the navigation environment, in particular in parking and maneuvering scenarios, even in motor vehicles having a comparatively simple sensor device.

Within the context of the method according to the disclosure, in a first step a navigation system can receive a navigation map from a central processing unit associated with the navigation environment, by means of a communication device on the motor vehicle side. The processing unit may be a back-end server, for example. Alternatively, it is also possible for the navigation map to already be provided in the motor vehicle, for example implementing buffering for regions that have been driven. In a further step, the navigation system may determine a target position, for example a parking place for the motor vehicle, obtain the position as a result of a selection by a user, or receive the target position determined by the processing unit. Subsequently, the processing unit can determine the navigation route by taking account of the navigation map. In parallel therewith, the navigation system, having a porcessor, can implement the vehicle guidance algorithm which evaluates the input data. The training data on which the training of the vehicle guidance algorithm is based may include correlations between sensor data and a behavior pattern in the form of a transverse and/or longitudinal guidance action. A conceivable embodiment of the vehicle guidance algorithm is for example a deep neuronal network, as is known from the project "Deep Driving" of Princeton University (cf. C. Chen, A. Seff, A. Kornhauser and J. Xiao: DeepDriving: Learning Affordance for Direct Perception in Autonomous Driving, The IEEE International Conference on Computer Vision (ICCV), 2015, pp. 2722-2730). If the automatic guidance accordance to the determined transverse and/or longitudinal guidance action is activated, the navigation system can implement the automatic guidance according to the determined transverse and/or longitudinal guidance action by actuating at least one steering device, drive device and/or braking device of the motor vehicle.

In some embodiments according to the disclosure, the vehicle guidance algorithm which has been trained, in particular at the factory, can be used on the basis of training data that describe movements of the motor vehicle within at least one reference navigation environment. The training data can thus be detected during at least one journey of the motor vehicle in the reference navigation environment, for example within the context of a training journey, and/or may include a known "ground truth," in particular a description of passable and impassable regions of the reference navigation environment. In this case, it is preferable for the training data to be detected, in a training journey of this kind, for a reference motor vehicle that is comparable to the motor vehicle, in particular with respect to the sensor device. The vehicle guidance algorithm is preferably trained at the factory, on the basis of training data of this kind. It is thus possible for driving behavior that is desired by the manufacturer to be memorized by means of the selection of the training data and/or by means of the parameterization. It is in addition possible for the navigation system to itself gather further training data during the journeys of the motor vehicle and for the vehicle guidance algorithm to be trained continuously, on the basis of the training data. The database of the vehicle guidance algorithm can thus be rapidly expanded, either by means of the training during the journeys of the motor vehicle or by easily installable updates based on improved training data.

It is desirable for a vehicle guidance algorithm to be used that has been trained with respect to preventing collisions and/or implementing a movement of the motor vehicle in accordance with a requirement to drive on the right-hand side or on the left-hand side of the road. The training data can therefore be obtained on the basis of movements in the reference navigation environment, during which movements obstacles described by the sensor data are avoided by means of specific transverse and/or longitudinal movement actions, and/or during which movements a collision with obstacles of this kind is prevented. The vehicle guidance algorithm can also be trained by means of systematically following a requirement to drive on the right-hand side or on the left-hand side of the road during the training, so as to comply with a requirement of this kind.

It is particularly preferable for the automated guidance of the motor vehicle to begin only after a control action that is carried out by the driver and indicates a desire for automatic guidance has been received. Typically, the driver initially controls the motor vehicle manually and, when automated guidance is desired, starts the automatic guidance by means of the control action with respect to an input device of the motor vehicle. As a result, a driver-monitored navigation system can be achieved, in which the use of the vehicle guidance algorithm is rendered safe by means of the responsibility for the operation of the motor vehicle remaining with the driver.

In this case, during the execution thereof the vehicle guidance algorithm can check, on the basis of the sensor data, whether the determination of a future transverse and/or longitudinal guidance action is available and, in the event of availability being determined, the driver can be issued with a notification indicating that the control action can be accepted. In other words, the vehicle guidance algorithm is implemented and checked in the background, during the journey, in particular after the navigation environment has been reached, in order to ascertain whether the sensor data currently available are sufficient for guiding the motor vehicle automatically. In this case, the navigation system can actuate an output device of the motor vehicle so as to output the notification. The driver thus always receives information regarding the availability of the automated guidance and can activate the guidance, if desired, by means of the control action.

In some embodiments according to the disclosure, the vehicle guidance algorithm can select, in the event of a plurality of options being determined for a future transverse and/or longitudinal guidance action, in particular for a travel direction decision, one option on the basis of the navigation route and/or a control action that is carried out by the driver and indicates the desired transverse and/or longitudinal guidance action. It is thereby possible to resolve ambiguities which the vehicle guidance algorithm alone cannot resolve on the basis of machine learning, by means of incorporating knowledge from the navigation map that is known a priori and/or from the intention of the driver. This significantly improves the controllability of the operation of the navigation system.

In some embodiments according to the disclosure, the navigation system can implement an additional collision prevention algorithm that uses the sensor data as input data and that modifies and/or prevents the transverse and/or longitudinal guidance action determined by the vehicle guidance algorithm if an imminent collision of the motor vehicle with an obstacle is detected. In other words, a redundant evaluation of the sensor data on the basis of an analytical collision prevention algorithm is proposed, which algorithm can overrule the transverse and/or longitudinal guidance action determined by the vehicle guidance algorithm, typically without a situation interpretation. The collision prevention algorithm is in particular implemented independently of any training based on the training data. Within the context of performing the collision prevention algorithm, for example the distance from an obstacle described by the sensor data can be evaluated and, in the event of a threshold value not being met, the modification and/or prevention of the transverse and/or longitudinal guidance action can take place. It is thus advantageously possible to achieve substantially more robust operation of the navigation system.

In some embodiments according to the disclosure, the sensor device can include at least one sensor that provides raw data, wherein the at least one sensor can be an ultrasonic sensor, a radar sensor, a laser sensor, a camera, and/or the sensor data describing an environment model of the motor vehicle that is derived from the raw data. Raw data of individual sensors of the sensor device can thus be merged to form the environment model, suitable merger and transformation algorithms being known from the prior art. The environment model particularly preferably reproduces the environment of the motor vehicle from a bird's-eye perspective (view from above).

In some embodiments according to the disclosure, the automatic guidance of the motor vehicle can be terminated when the target position is reached and/or in the event of a control action that is carried out by the driver and indicates a desire to terminate the automatic guidance. The control action can also be detected by the input device of the motor vehicle.

The object of the disclosure is furthermore achieved according to the disclosure by means of a motor vehicle including a navigation system that is designed to carry out the method according to the disclosure. All the embodiments of the method according to the disclosure can be transferred, in an analogous manner, to the motor vehicle according to the disclosure, with the result that the above-mentioned advantages can also be achieved thereby.

Further advantages and details of the disclosure can be found in the embodiments that are described in the following, and with reference to the drawings.

FIG. 1 is a schematic view of a motor vehicle according to some embodiments of the disclosure.

Figure 2:
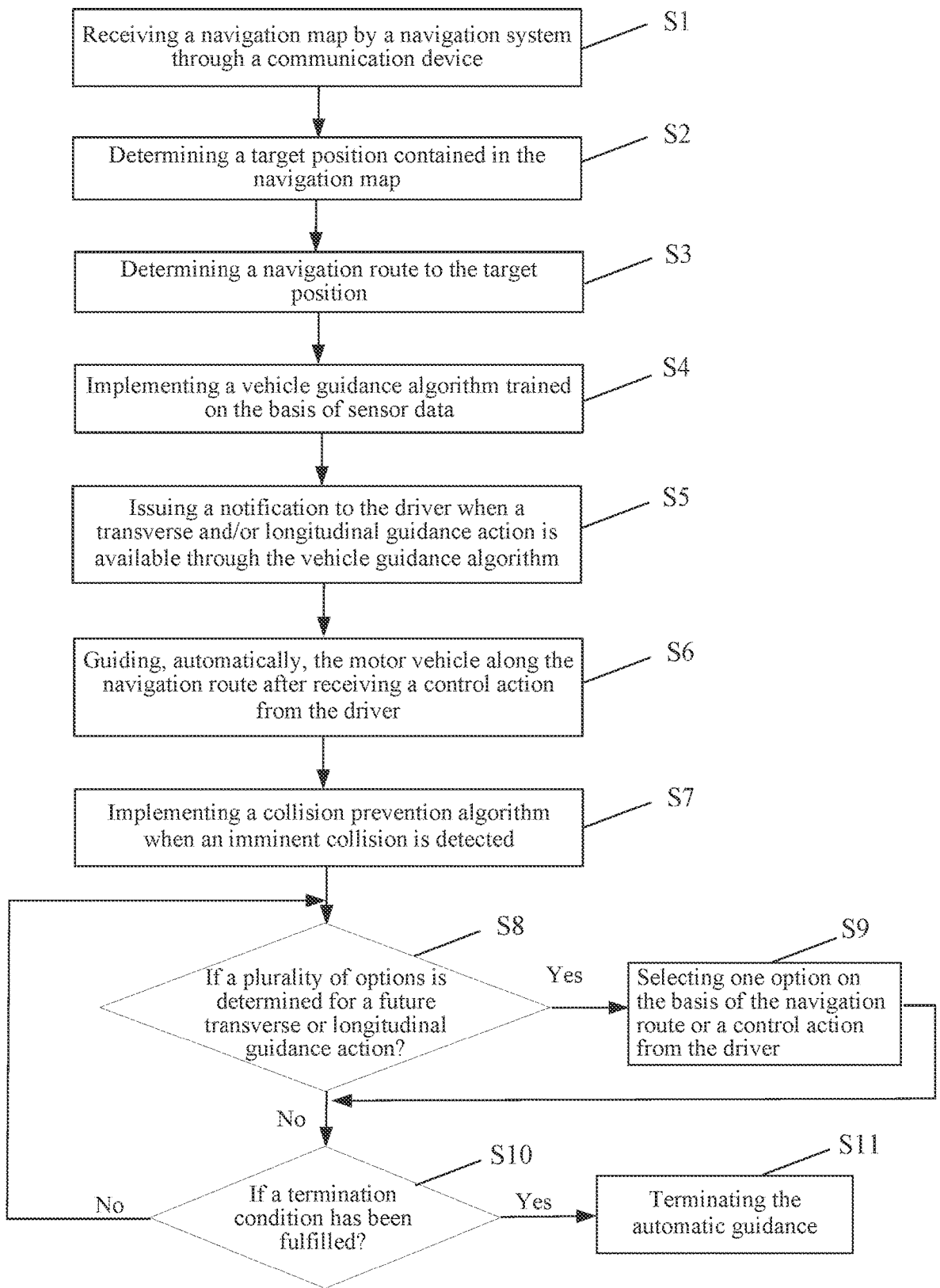
FIG. 2 is a flow diagram of the method for operating the motor vehicle according to some embodiments of the disclosure.

FIG. 2 is a flow diagram of the method according to some embodiments of the disclosure.

FIG. 1 is a schematic view of a motor vehicle 1 including a navigation system 2 by means of which a steering device 3, a drive device 4 and a braking device 5 of the motor vehicle 1 can be actuated in order to carry out transverse and longitudinal guidance actions. The navigation system 2 receives sensor data from a sensor device 6 of the motor vehicle 1, which data describe an environment model. For this purpose, the sensor device 6 includes a plurality of ultrasonic sensors 7, radar sensors 8, laser sensors 9 and cameras 10 which detect the surroundings of the motor vehicle and the raw data of which are merged to form the environment model.

In addition, an input device 11, using which a driver of the motor vehicle 1 can carry out control actions determinable by the navigation system 2, for example by means of a manual input and/or voice input, and an output device 12 for visually and/or acoustically and/or haptically outputting notifications to the driver, are provided on the motor vehicle side. Data can be transmitted to and from a processing unit 14 external to the motor vehicle by means of a communication device 13 (e.g., a transceiver) of the motor vehicle 1. The processing unit is a back-end server that is assigned to a navigation environment in the form of a parking environment and that assists the motor vehicle 1 when navigating within the parking environment.

FIG. 2 is a flow diagram of a method for operating the motor vehicle 1 in the parking environment, the navigation system 2 being designed to carry out the method.

In a step S1, for example when passing through an entrance to the parking environment, the communication device 13 receives, from the processing unit 14, a high-precision digital navigation map of the parking environment that describes passable and impassable regions, and provides the map to the navigation system 2.

In a following step S2, the navigation system 2 determines a target position contained in the navigation map. For this purpose, a driver of the motor vehicle 1 may make a selection, via the input device 11, from a plurality of possible target positions, a target position assigned by the processing unit 14 may be called up by means of the communication device 13, or a suitable target position may be determined by the navigation system 2 itself. The target position is typically a parking place in which the motor vehicle 1 is intended to be parked.

In a step S3, the navigation device 2 determines a navigation route to the target position, taking account of the navigation map.

In a step S4, a vehicle guidance algorithm is started and implemented by the navigation system 2. The vehicle guidance algorithm uses the sensor data provided by the sensor device 6 as input data, and has been trained, by means of machine learning, on the basis of training data. For this purpose, during a training journey using a reference vehicle, sensor data which correspond to the sensor data of the sensor device 6, and transverse and/or longitudinal movement actions of a driver, are detected and correlated with one another. The vehicle guidance algorithm has been trained in particular with respect to preventing collisions and implementing a movement of the motor vehicle 1 in accordance with a requirement to drive on the right-hand side or on the left-hand side of the road. If sensor data of sufficient scope and sufficient quality are available as input data for the vehicle guidance algorithm, the algorithm determines possible transverse and/or longitudinal guidance actions for the motor vehicle 1. The vehicle guidance algorithm thus continuously checks whether the determination of a future transverse and/or longitudinal guidance action is available.

If this is the case, the navigation system 2 actuates the output device 12, in a step S5, so as to output that a control action can be accepted, in order to activate automatic guidance of the motor vehicle 1 in accordance with the transverse and/or longitudinal guidance actions determined by the vehicle guidance algorithm. The driver can therefore switch from manual driving to automated guidance, monitored by the driver, using the navigation system 2.

If the navigation system 2 detects, via the input device 11, a control action of the driver that indicates a desire for automatic guidance, the automatic guidance of the motor vehicle, in accordance with the transverse and/or longitudinal guidance actions determined by the vehicle guidance algorithm on the basis of the sensor data, is begun automatically, along the navigation route, in a step S6.

In a following step S7, the navigation system 2 starts an additional collision prevention algorithm that uses the sensor data as input data, is performed in parallel with the vehicle guidance algorithm, and modifies or prevents the transverse and/or longitudinal guidance action determined by the vehicle guidance algorithm if an imminent collision of the motor vehicle 1 with an obstacle is detected. In this case, the collision prevention algorithm carries out a conventional analytical evaluation of the sensor data with respect to obstacles in the environment of the motor vehicle 1 and can intervene in the automatic guidance of the motor vehicle 1 in the event of an obstacle, to which the vehicle guidance algorithm does not react by means of a corresponding transverse and/or longitudinal guidance action, being detected. The collision prevention algorithm thus overrules, if necessary, the vehicle guidance algorithm trained on the basis of machine learning.

During the automatic guidance of the motor vehicle 1 a query is made, in a step S8, as to whether the vehicle guidance algorithm has determined a plurality of options for a future transverse and/or longitudinal guidance action, for example for a travel direction decision.

If this is the case, the navigation system 2 actuates the output device 12, in a step S9, so as to output a further notification to the driver. The notification commands the driver to select one of the options determined by the vehicle guidance algorithm for the future transverse and/or longitudinal guidance action. The further automatic guidance of the motor vehicle 1 then takes place on the basis of a following control action that is carried out by the driver and indicates the desired transverse and/or longitudinal guidance action. Alternatively, the navigation system 2 selects one of the options, on the basis of the determined navigation route, and thereby resolves the ambiguity identified by the vehicle guidance algorithm.

In a step S10, a check is made as to whether a termination condition for the automatic guidance of the motor vehicle 1 has been fulfilled. Reaching the target position and the detection of a control action that is carried out by the driver, using the input device 11, and that indicates a desire to terminate the automatic guidance, are defined as termination conditions.

If a termination condition of this kind is fulfilled, the method is terminated in a step S11. The driver therefore has the option of regaining control of the motor vehicle 1 from the navigation system 2 at any time. If none of the termination conditions are fulfilled, the method returns to step S8, and therefore the checks for ambiguities and fulfilment of a termination condition are continued continuously.

It should additionally be noted, at this point, that the training data for the vehicle guidance algorithm can be expanded during manual guidance of the motor vehicle 1, in parallel with the above-mentioned steps, by means of the driving behavior of the driver being detected and correlated with the sensor data of the sensor device 6. In this way, the vehicle guidance algorithm can be further trained and the automatic guidance of the motor vehicle can be improved following activation of the vehicle guidance algorithm.

The invention claimed is:

1. A method for operating an automated motor vehicle in a parking environment, comprising:
    receiving, by a transceiver of the automated motor vehicle, a digital navigation map of the parking environment, wherein the digital navigation map describes a roadway network;
    determining, by a navigation system of the automated motor vehicle, a navigation route to a target position within the parking environment contained in the digital navigation map, wherein the navigation system comprises a processor;
    providing, by a sensor device on an automated motor vehicle side, sensor data, wherein the sensor data describe surroundings of the automated motor vehicle;
    training, by means of machine learning, a vehicle guidance algorithm based on training data, wherein the vehicle guidance algorithm uses the sensor data as input data;
    implementing, by the navigation system, the vehicle guidance algorithm and a collision prevention algorithm; and
    guiding, automatically, the automated motor vehicle along the navigation route to the target position according to a transverse or longitudinal guidance action determined by the vehicle guidance algorithm, wherein the collision prevention algorithm uses the sensor data as input data independently of any training based on the training data to modify or prevent the transverse or longitudinal guidance action when a threshold value of a distance from an obstacle evaluated by the sensor data is not met.

2. he method of claim 1, wherein the training of the vehicle guidance algorithm includes performing the training of the vehicle guidance algorithm at a factory, based on training data that describe movements of the automated motor vehicle within a reference parking environment.

3. The method of claim 1, wherein the training of the vehicle guidance algorithm includes performing the training of the vehicle guidance algorithm with respect to implementing a movement of the automated motor vehicle in accordance with a requirement to drive on a right-hand side or on a left-hand side of a road.

4. The method of claim 1, further comprising:
    receiving, prior to the automatically guiding of the automated motor vehicle, a control action wherein the control action is carried out by a driver and indicates a desire for automatic guidance.

5. The method of claim 4, further comprising:
    checking, by the vehicle guidance algorithm, based on the sensor data, whether the determination of the transverse or longitudinal guidance action is available; and
    issuing, in an event of availability being determined, a notification to the driver.

6. The method of claim 1, further comprising:
    selecting, by the vehicle guidance algorithm, in an event of a plurality of options being determined for the transverse or longitudinal guidance action, in particular for a travel direction decision, one option based on the navigation route or a control action that is carried out by a driver and indicates a desired transverse or longitudinal guidance action.

7. The method of claim 1, wherein:
    the sensor device comprises an ultrasonic sensor, a radar sensor, a laser sensor or a camera, and provides raw data; and
    the sensor data describes an environment model of the automated motor vehicle that is derived from the raw data.

8. The method of claim 1, further comprising:
    terminating automatic guidance of the automated motor vehicle when the target position is reached or in an event of a control action that is carried out by a driver and indicates a desire to terminate the automatic guidance.

9. An automated motor vehicle, comprising:
    a sensor device, configured to provide sensor data, wherein the sensor data describe surroundings of the automated motor vehicle;
    a transceiver, configured to receive a digital navigation map of a parking environment; and a navigation system, comprising a processor and configured to determine a navigation route to a target position within the parking environment contained in the digital navigation map, and implement a vehicle guidance algorithm and a collision prevention algorithm, wherein:

the vehicle guidance algorithm is trained by means of machine learning using the sensor data as input data and is configured to determine a transverse or longitudinal guidance action;

the automated motor vehicle is guided automatically along the navigation route to the target position according to the transverse or longitudinal guidance action; and the collision prevention algorithm uses the sensor data as input data independently of any training based on the training data to modify or prevent the transverse or longitudinal guidance action when a threshold value of a distance from an obstacle evaluated by the sensor data is not met.

10. The automated motor vehicle of claim 9, wherein the sensor device comprises an ultrasonic sensor, a radar sensor, a laser sensor or a camera.

11. The automated motor vehicle of claim 9, wherein the vehicle guidance algorithm is trained at a factory, based on training data that describe movements of the automated motor vehicle within a reference parking environment.

12. The automated motor vehicle of claim 9, wherein the vehicle guidance algorithm is trained to implement a movement of the automated motor vehicle in accordance with a requirement to drive on a right-hand side or on a left-hand side of a road.

13. The automated motor vehicle of claim 9, further comprising: an output device configured to output a notification to the driver after the transverse or longitudinal guidance action is determined.

14. The automated motor vehicle of claim 9, further comprising: an input device configured to receive a control action carried out by a driver.

15. The automated motor vehicle of claim 14, wherein the control action indicates a desire for automatic guidance or a desire to terminate the automatic guidance.

16. The automated motor vehicle of claim 9, wherein the vehicle guidance algorithm is further configured to select, in an event of a plurality of options being determined for the transverse or longitudinal guidance action, in particular for a travel direction decision, one option based on the navigation route or a control action that is carried out by a driver and indicates a desired transverse or longitudinal guidance action.

* * * * *